US007506562B2

(12) United States Patent
Franze et al.

(10) Patent No.: US 7,506,562 B2
(45) Date of Patent: Mar. 24, 2009

(54) RATCHET ASSEMBLY

(75) Inventors: Patrick L. Franze, Atwater, OH (US); Donald L. Franze, Atwater, OH (US)

(73) Assignee: Randolph Tool Company, Inc., Hartville, OH (US)

( * ) Notice: Subject to any disclaimer, the term of this patent is extended or adjusted under 35 U.S.C. 154(b) by 233 days.

(21) Appl. No.: 10/831,262

(22) Filed: Apr. 23, 2004

(65) Prior Publication Data

US 2004/0211288 A1 Oct. 28, 2004

Related U.S. Application Data

(60) Provisional application No. 60/465,162, filed on Apr. 23, 2003.

(51) Int. Cl.

| | |
|---|---|
| ***G05G 1/00*** | (2006.01) |
| ***G05G 3/00*** | (2006.01) |
| ***F16H 7/08*** | (2006.01) |
| ***F16H 7/22*** | (2006.01) |
| ***F16D 65/14*** | (2006.01) |

(52) U.S. Cl. ........................ 74/575; 74/527; 74/577 M; 74/578; 74/144; 474/109; 188/196 B

(58) Field of Classification Search ................... 74/527, 74/473.37, 551.8, 470, 528, 575, 577 M, 74/578, 144; 147/48, 148; 474/109; 269/317; 403/60; 248/339; 30/102
See application file for complete search history.

(56) References Cited

U.S. PATENT DOCUMENTS

| | | | | |
|---|---|---|---|---|
| 431,806 | A | | 7/1890 | Cunningham et al. |
| 1,114,896 | A | | 10/1914 | MacRae |
| 2,087,932 | A | | 7/1937 | Zola et al. |
| 2,353,064 | A | | 7/1944 | Parham |
| 2,605,987 | A | | 8/1952 | Brown et al. |
| 2,685,487 | A | | 8/1954 | Woller |
| 2,685,824 | A | * | 8/1954 | Coop ......................... 269/317 |
| 2,719,693 | A | * | 10/1955 | Penberthy ................... 248/339 |
| 2,780,324 | A | * | 2/1957 | O'Boyle ................. 188/196 B |
| RE24,496 | E | * | 7/1958 | Cornelius .................... 74/527 |
| 3,443,784 | A | | 5/1969 | Walkinshaw |
| 3,471,185 | A | * | 10/1969 | Parr ............................ 403/60 |
| 3,854,428 | A | | 12/1974 | Fullenkamp |
| 3,965,572 | A | * | 6/1976 | Strybel ........................ 30/102 |
| 4,119,044 | A | | 10/1978 | Hines |
| 4,289,292 | A | | 9/1981 | Kunjumon |

(Continued)

OTHER PUBLICATIONS

U.S. Appl. No. 10/829,663, filed Apr. 22, 2004; see Fig. 14.

*Primary Examiner*—Vinh T Luong
(74) *Attorney, Agent, or Firm*—Zollinger & Burleson Ltd.

(57) ABSTRACT

A ratchet assembly includes a threaded rod and a support collar that defines a bore. A portion of the threaded rod is disposed in the axial bore of the support collar. A ratchet pawl is pivotable carried by the support collar between locked and unlocked positions. The ratchet pawl has at least one tooth that threadably engages the threaded rod when the ratchet pawl is in the locked position to allow the threaded rod to threadably rotate with respect to the support collar for fine position adjustments. The ratchet pawl automatically pivots to the unlocked position when the threaded rod is forced in a direction from the first end toward the second end to allow for gross position adjustments.

8 Claims, 8 Drawing Sheets

U.S. PATENT DOCUMENTS

| | | | | |
|---|---|---|---|---|
| 4,293,381 | A * | 10/1981 | Goetzmann et al. | 376/230 |
| 4,391,160 | A * | 7/1983 | Myers | 74/551.8 |
| 4,798,098 | A * | 1/1989 | Keller et al. | 74/470 |
| 4,807,836 | A | 2/1989 | Price et al. | |
| 5,615,620 | A | 4/1997 | Owen | |
| 5,713,809 | A * | 2/1998 | Yamamoto et al. | 474/110 |
| 6,035,738 | A * | 3/2000 | Huggins et al. | 74/473.37 |
| 6,240,856 | B1 | 6/2001 | Paskey et al. | |
| 6,857,378 | B2 | 2/2005 | Franze | |
| 6,866,601 | B2 * | 3/2005 | Saitoh et al. | 474/109 |
| 6,878,082 | B2 * | 4/2005 | Seungpyo | 474/109 |
| 7,086,632 | B2 | 8/2006 | Hsieh | |
| 2005/0115641 | A1 * | 6/2005 | Fox et al. | 147/48 |

* cited by examiner

RATCHET ASSEMBLY

CROSS REFERENCE TO RELATED APPLICATIONS

This application claims priority from U.S. Provisional Patent application Ser. No. 60/465,162 filed Apr. 23, 2003; the disclosure of which is incorporated herein by reference.

BACKGROUND OF THE INVENTION

1. Technical Field

The present invention generally relates to ratchet assemblies and, more particularly, to ratchet assemblies that are used to adjust the position of larger items such as work tables and hold down devices. Specifically, the present invention relates to ratchets that allow for fine and gross position adjustments.

2. Background Information

Numerous applications require a ratchet or adjustment assembly that allows the position of two elements to be adjusted with respect to each other. For example, a work table in a product assembly operation may need to be adjusted between different positions for different products or different workers. Another example is a hold down tool that may be positioned by the user to temporarily hold the position of a work piece until the user completes an assembly step. The user releases and removes the hold down device and starts again with the next product. In this situation, the user desires a mechanism that supports the hold down device while allowing easy release and ready adjustability even while the hold down device is locked in place.

BRIEF SUMMARY OF THE INVENTION

The invention provides a ratchet assembly that allows the position of two items to be adjusted with respect to each other. The ratchet assembly provides for fine position adjustment without the need to release the ratchet from the engaged position. The ratchet assembly also allows gross position changes to be made quickly and easily. In one direction, the ratchet pawl may remain engaged during the gross position change. In the other direction, the ratchet pawl locks the position of the gross adjustment until the pawl is unlocked.

The invention also provides a spring biased ratchet pawl that automatically returns to a locked position.

Another feature of the invention is the use of curved teeth on the ratchet pawl to threadably engage the threads of a threaded rod that passes through the collar of the ratchet.

The invention also provides a handle for the pawl that allows the pawl to be quickly and easily unlocked by the user with one hand without special tools being used.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
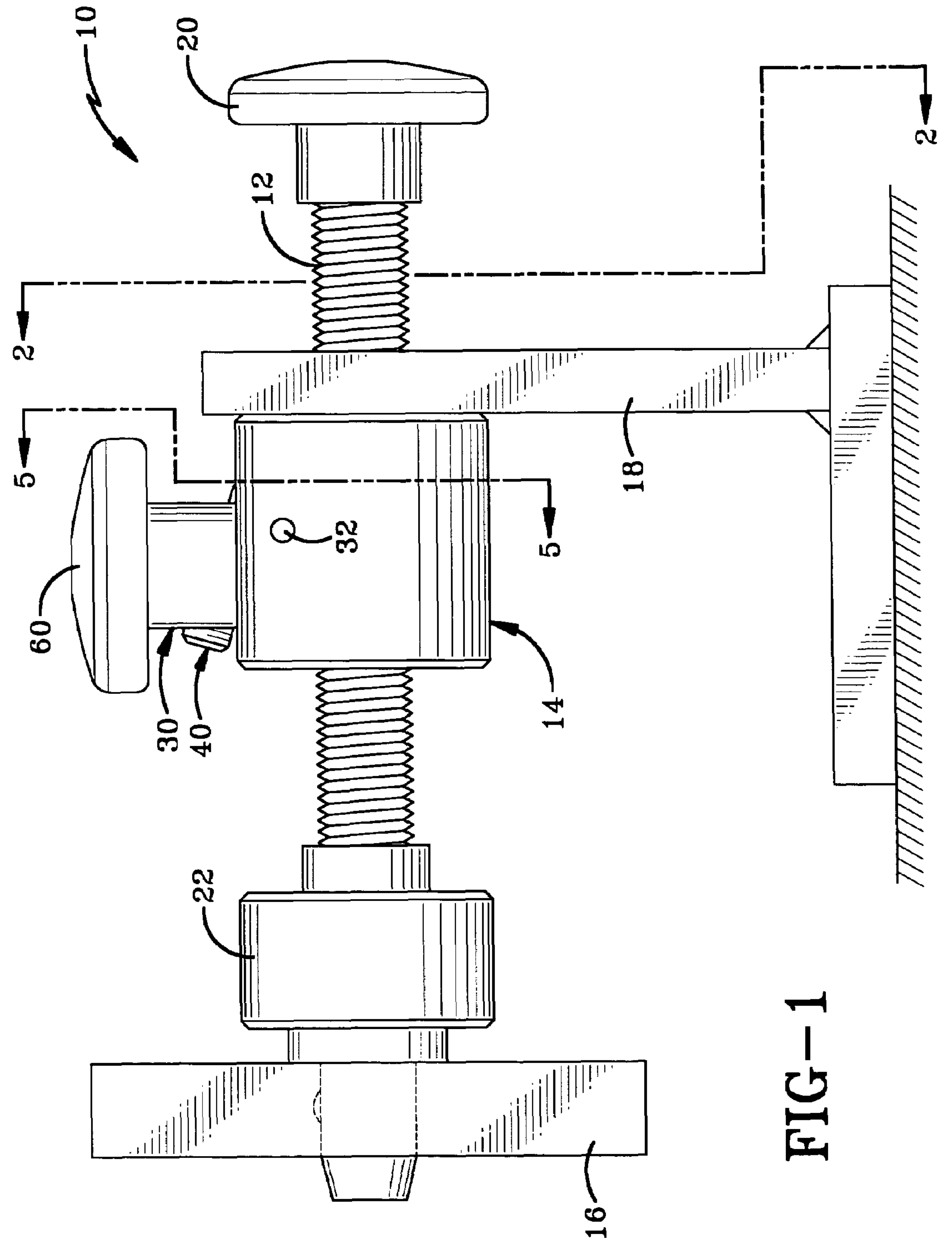
FIG. 1 is a side elevation view of the ratchet assembly of the invention in a locked condition.
Figure 2:
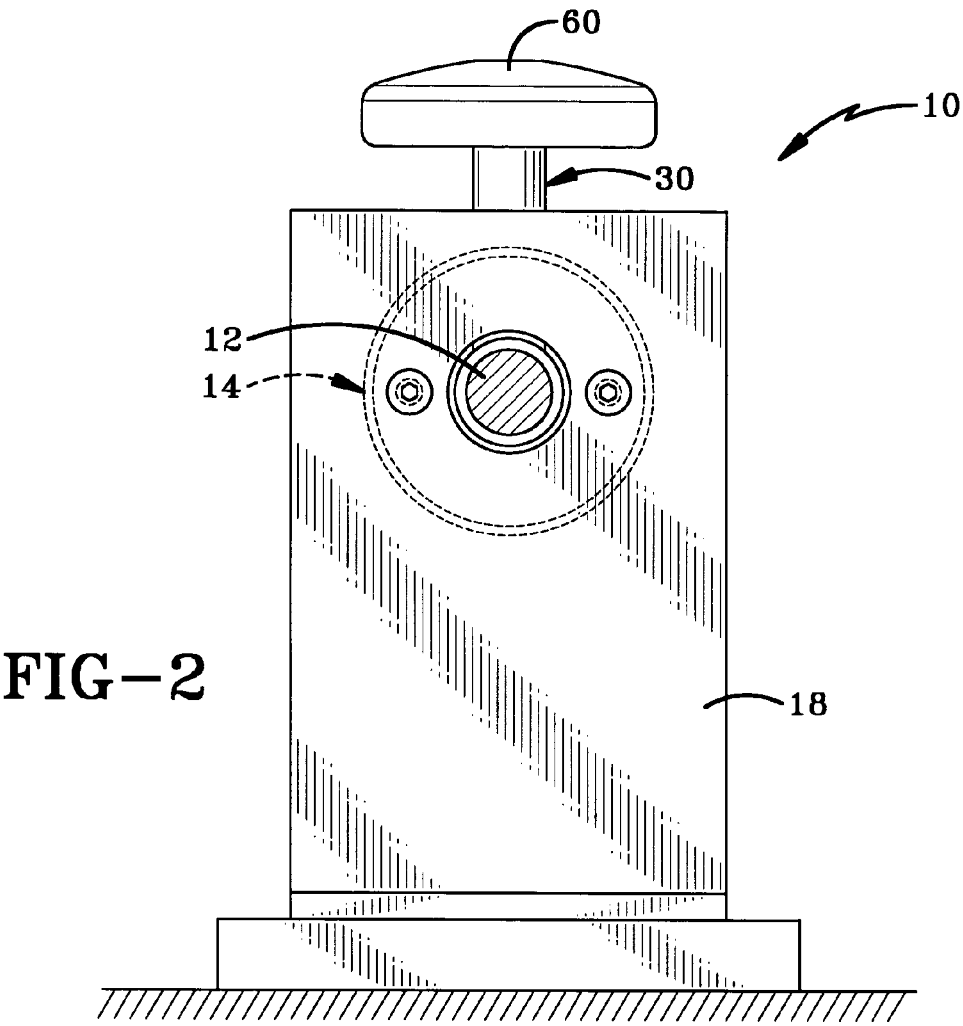
FIG. 2 is a section view taken along line 2-2 of FIG. 1.
Figure 3:
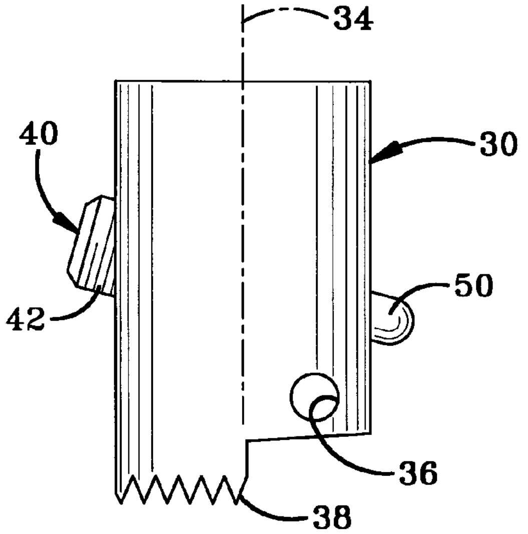
FIG. 3 is a side elevation view of the ratchet pawl.

The ratchet assembly of the present invention is indicated generally by the numeral 10 in the accompanying drawings. Ratchet assembly 10 generally includes a threaded rod 12 and a support collar 14. Threaded rod 12 has a longitudinal axis that defines the longitudinal direction of rod 12. Rod 12 has opposed first and second ends in the longitudinal direction. Support collar 14 has an axial direction and a radial direction with the axial direction parallel to the longitudinal direction of rod 12. Support collar 14 defines an axial bore that receives a portion of rod 12. Ratchet assembly 10 may be used to adjustably hold a work piece 16 relative to a base 18. Base 18 may be a grounded member or a frame member on a piece of equipment. Ratchet assembly 10 is used to hold work piece 16 in a manner that allows the position of work piece 16 to be changed with a fine adjustment or a gross adjustment.

In order to finely adjust the position of work piece 16, the user rotates threaded rod 12. An end handle 20 may be provided at the first end of threaded rod 12 to help the user to rotate threaded rod 12. End handle 20 may have a smooth, rounded outer surface so that user may push on handle to make a gross adjustment of the position of work piece 16. When viewed from the first end of rod 12 toward the second end of rod 12, clockwise rotation of rod 12 moves rod 12 in a forward direction toward work piece 16. The smooth, rounded outer surface of handle 20 allows the user to push on handle with a hip when assembly 10 is mounted at waist level. This action allows the user to keep both hands on work piece 16. When pushed in the forward direction from end handle 20 toward collar 14, ratchet assembly 10 allows threaded rod to slide through collar 14 for gross position adjustments without the need to rotate rod 12. Ratchet assembly 10 must be released before pulling end handle 20 rearwardly away from collar 14. In other words, ratchet assembly 10 selectively locks the position of threaded rod 12 to prevent threaded rod 12 from moving in the rearward direction from collar 14 towards end handle 20.

Work piece 16 is mounted to the second end of threaded rod 12 with a mount 22 that allows the second end of threaded rod 12 to freely rotate with respect to mount 22. Mount 22 thus allows rod 12 to rotate with respect to work piece 16 so that work piece 16 does not rotate when the user makes fine adjustments to threaded rod 12.

Threaded rod 12 is slidably received through the axial bore defined by collar 14 such that the outer surface of threaded rod 12 slidingly engages the inner surface of support collar 14. A ratchet pawl 30 selectively engages threaded rod 12 to lock the gross position of rod 12 in the backward direction while also creating the threaded connection that allows for the fine adjustment in both directions. Ratchet pawl 30 is pivotally mounted to collar 14 in a manner that allows pawl 30 to threadably engage threaded rod 12 in a locked position. A pivot pin 32 provides the pivotal mounting connection between pawl 30 and collar 14. Pivot pin 32 is mounted to collar 14 above the axial bore that receives threaded rod 12. Pin 32 preferably extends entirely through pawl 32 into collar 14 on both sides of pawl 32.

Figure 4:
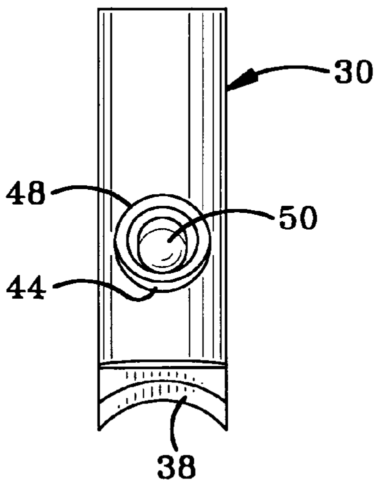
FIG. 4 is a bottom plan view of the ratchet pawl showing the curved teeth that threadably engage the threaded rod.
Figure 5:
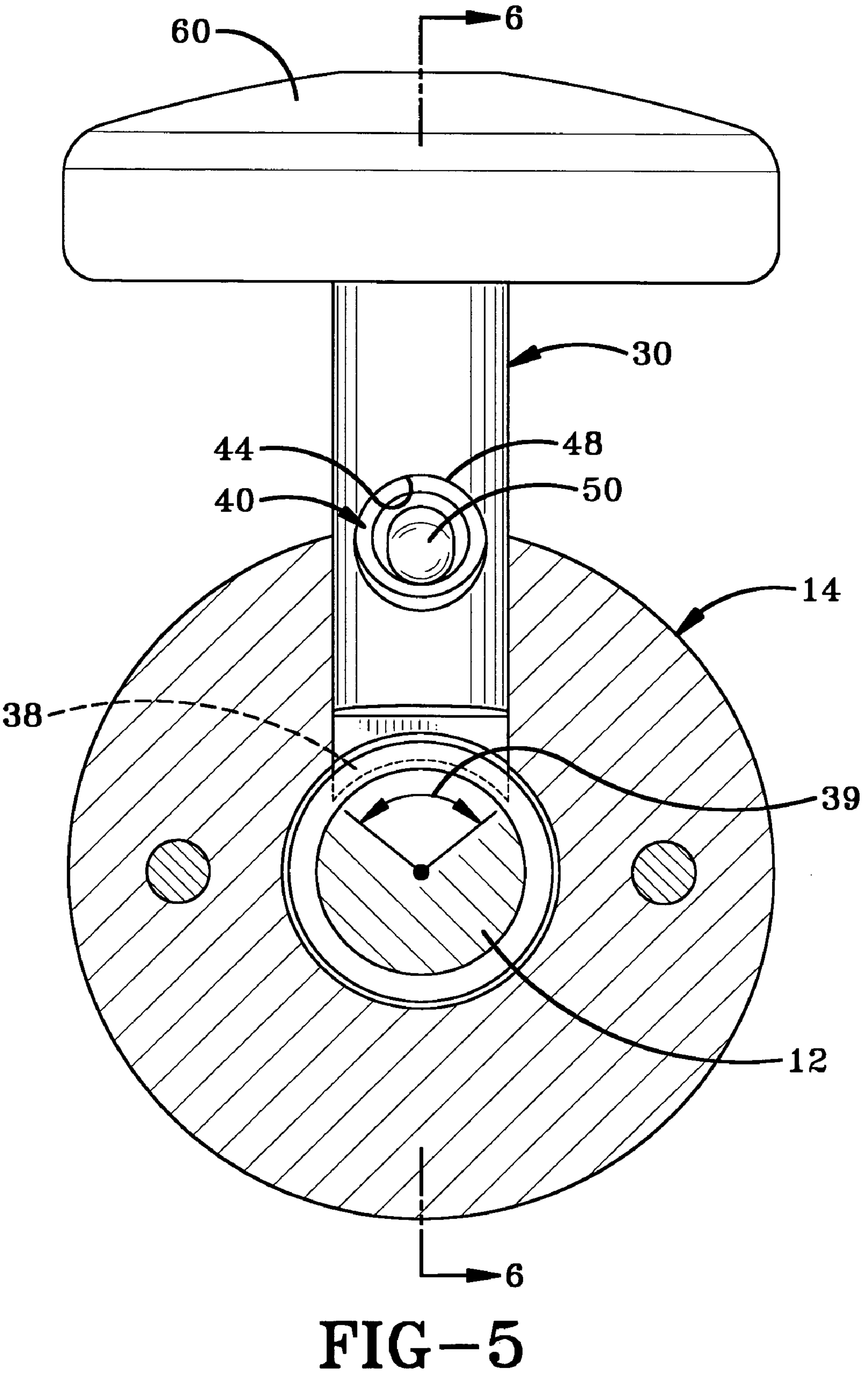
FIG. 5 is a section view taken along line 5-5 of FIG. 1.
Figure 6:
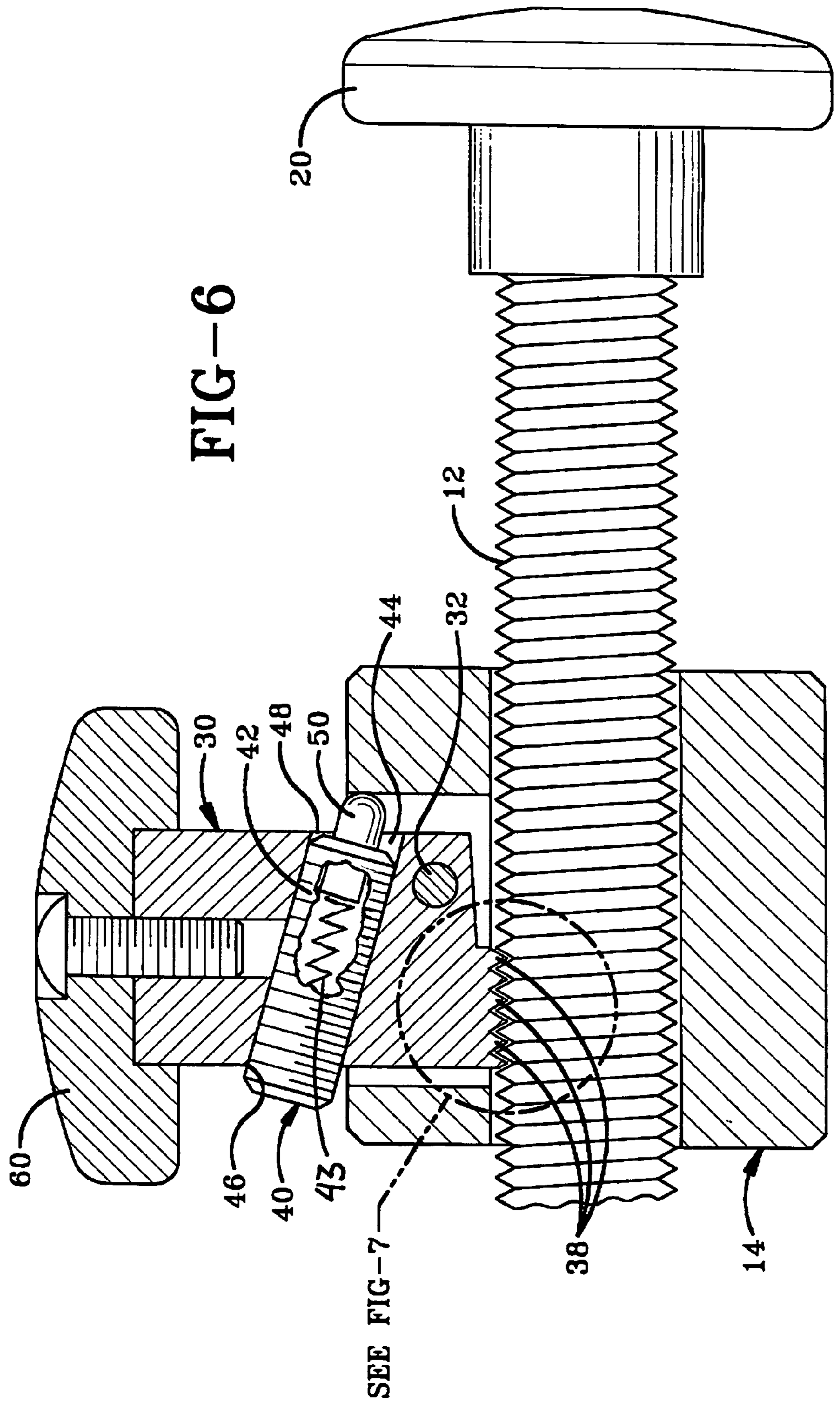
FIG. 6 is a section view taken along line 6-6 of FIG. 5 showing the pawl engaged with the threaded rod.
Figure 7:
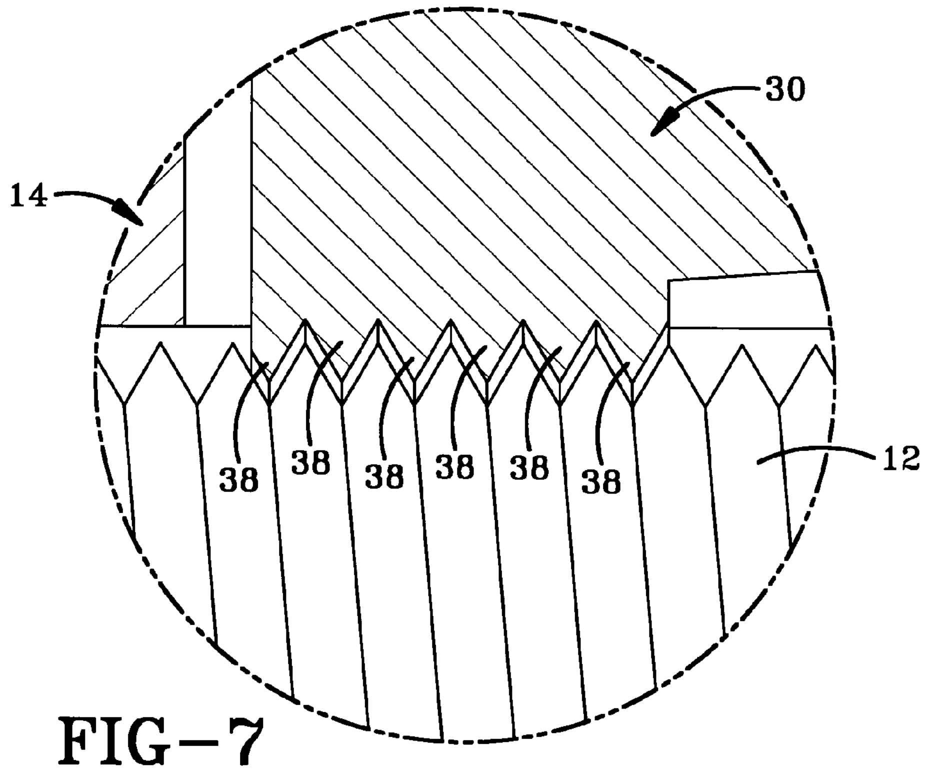
FIG. 7 is an enlarged view of the encircled portion of FIG. 6.
Figure 8:
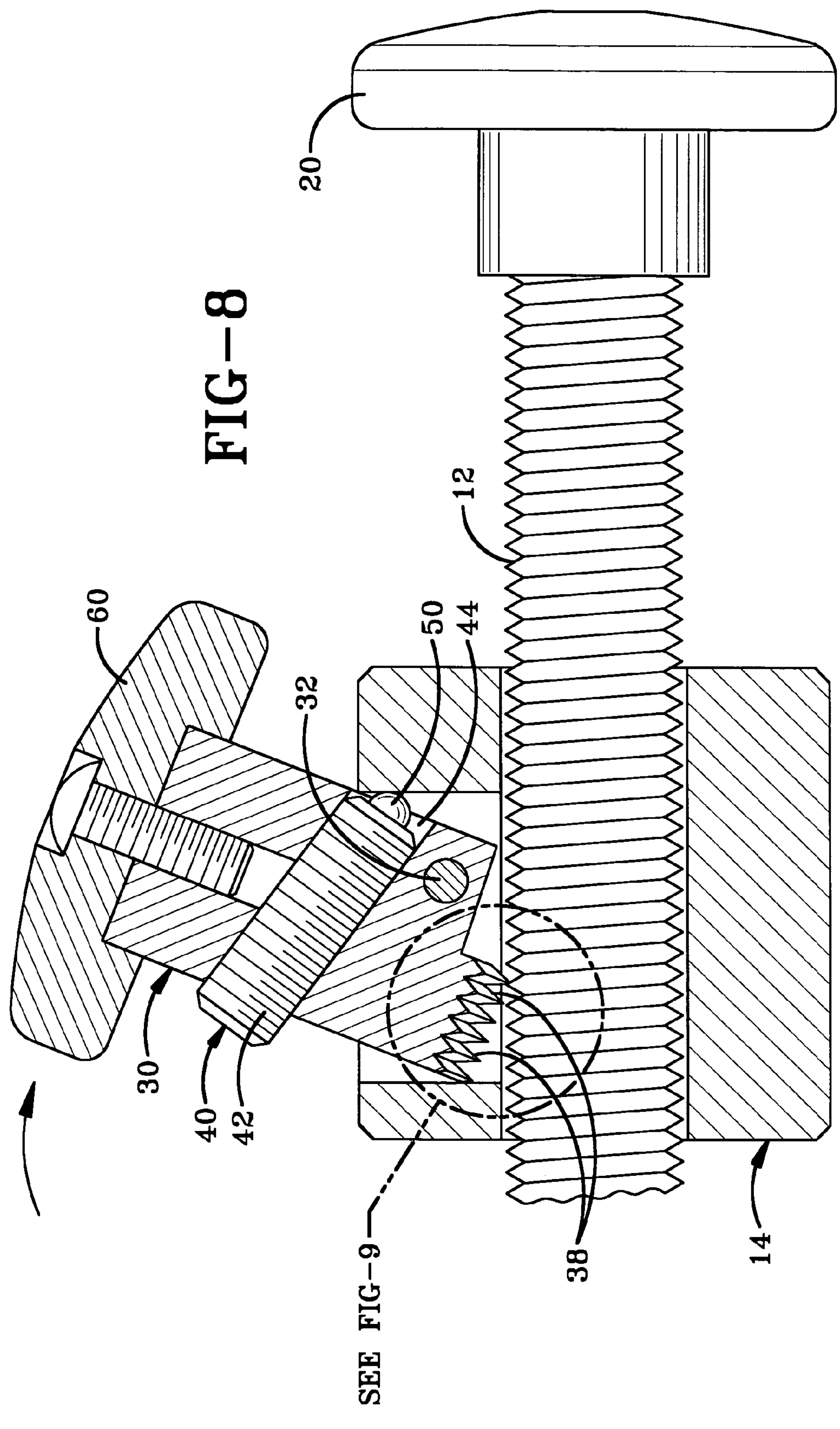
FIG. 8 is a section view similar to FIG. 6 showing the pawl disengaged with the threaded rod so that the threaded rod may be readily adjusted with respect to the collar.

Pawl 30 has a longitudinal centerline 34. The pivot axis 36 of pin 32 is perpendicular to and offset from centerline 34 as shown in FIG. 6. Pawl 30 includes at least one, but preferably a plurality of, teeth 38 disposed on the opposite side of centerline 34 than pivot axis 36. No teeth are positioned on the same side of centerline 34 as pivot axis 36. The pivoting motion thus tilts teeth 38 up and away from threaded rod 12 as shown in FIG. 8. Each tooth 38 is curved (FIG. 4) to match the curvature of the teeth on threaded rod 12. Each tooth 38 thus contacts threaded rod 12 along the entire width of tooth 38. This configuration gives ratchet pawl 30 strength to resist forces on work piece 16 and allows threaded rod 12 to smoothly rotate with respect to pawl 30. As shown in FIG. 5, the width of each tooth 38 is substantially equal to the overall width of pawl 30. When viewed along the longitudinal axis of threaded rod 12, each tooth 38 engages threaded rod 12 about an included angle 39 of 80 to 100 degrees.

Ratchet assembly 10 further includes a biasing element 40 that biases pawl 30 towards the locked position. Biasing element 40 includes an externally threaded sleeve 42 that is threaded into pawl 30. Pawl 30 defines a threaded opening 44 angled to have an inlet 46 that is outside collar 14 and an outlet 48 positioned to be at least partially inside collar 14. A push rod 50 is slidingly disposed within sleeve 42 and extends from outlet 48 to engage collar 14. A spring is disposed inside the sleeve 42 to bias push rod 50 outwardly as shown in FIG. 6. When the user tilts pawl 30 to the unlocked position depicted in FIG. 8, the spring is compressed and push rod 50 is received within sleeve 42. Biasing element 40 is designed to automatically snap back to the locked position When the user releases pawl 30.

A pawl handle 60 may be connected to the outer end of pawl 30 to provide a grip for the user when unlocking pawl 30. Handle 60 may have the same outwardly smooth configuration as handle 20. FIGS. 6-11 show the method of using ratchet assembly 10. In FIG. 6, the position of threaded rod 12 is locked with respect to pawl 30. In the locked position, threaded rod 12 may be advanced through collar 14 but may not be retracted. The lock is achieved by the position of pivot axis 36 with respect to teeth 38 as well as the configuration of teeth 38 and the threads on rod 12. In the locked position, the user may make fine adjustments to the position of threaded rod 12 by rotating threaded rod 12 with respect to collar 14. As shown in FIG. 6, collar 14 does not include any teeth aside from teeth 38 and allows threaded rod 12 to slide through collar 14 at will when pawl 30 is unlocked.

Figure 9:
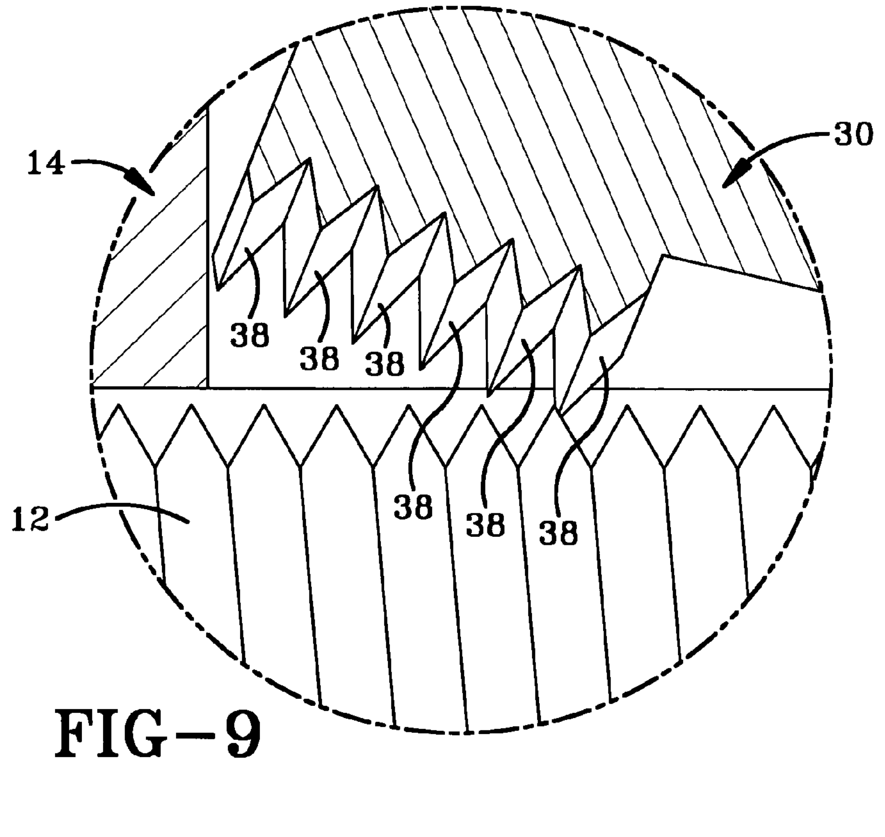
FIG. 9 is an enlarged view of the encircled portion of FIG. 8.
Figure 10:
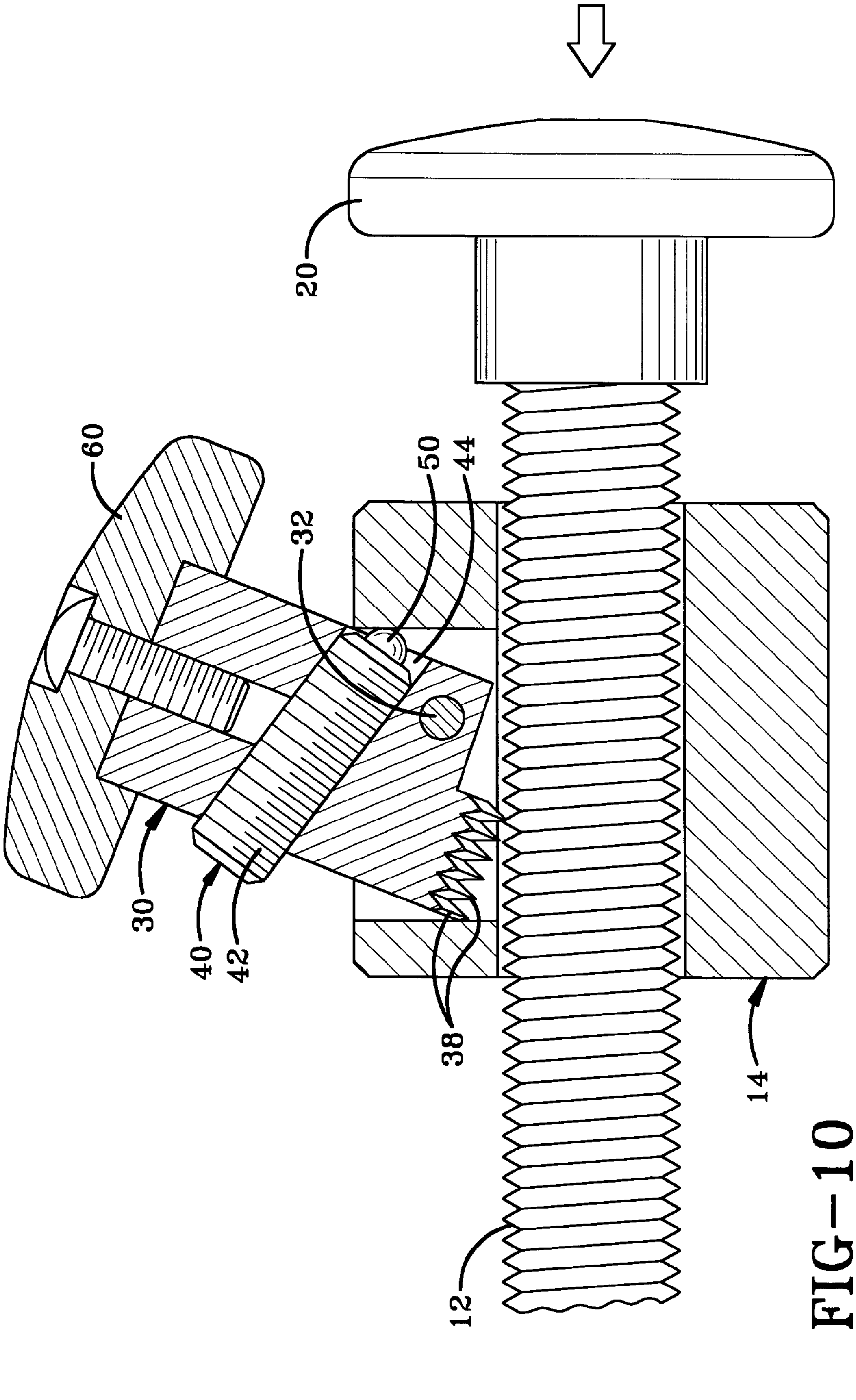
FIG. 10 shows the threaded rod being adjusted with respect to the collar.
Figure 11:
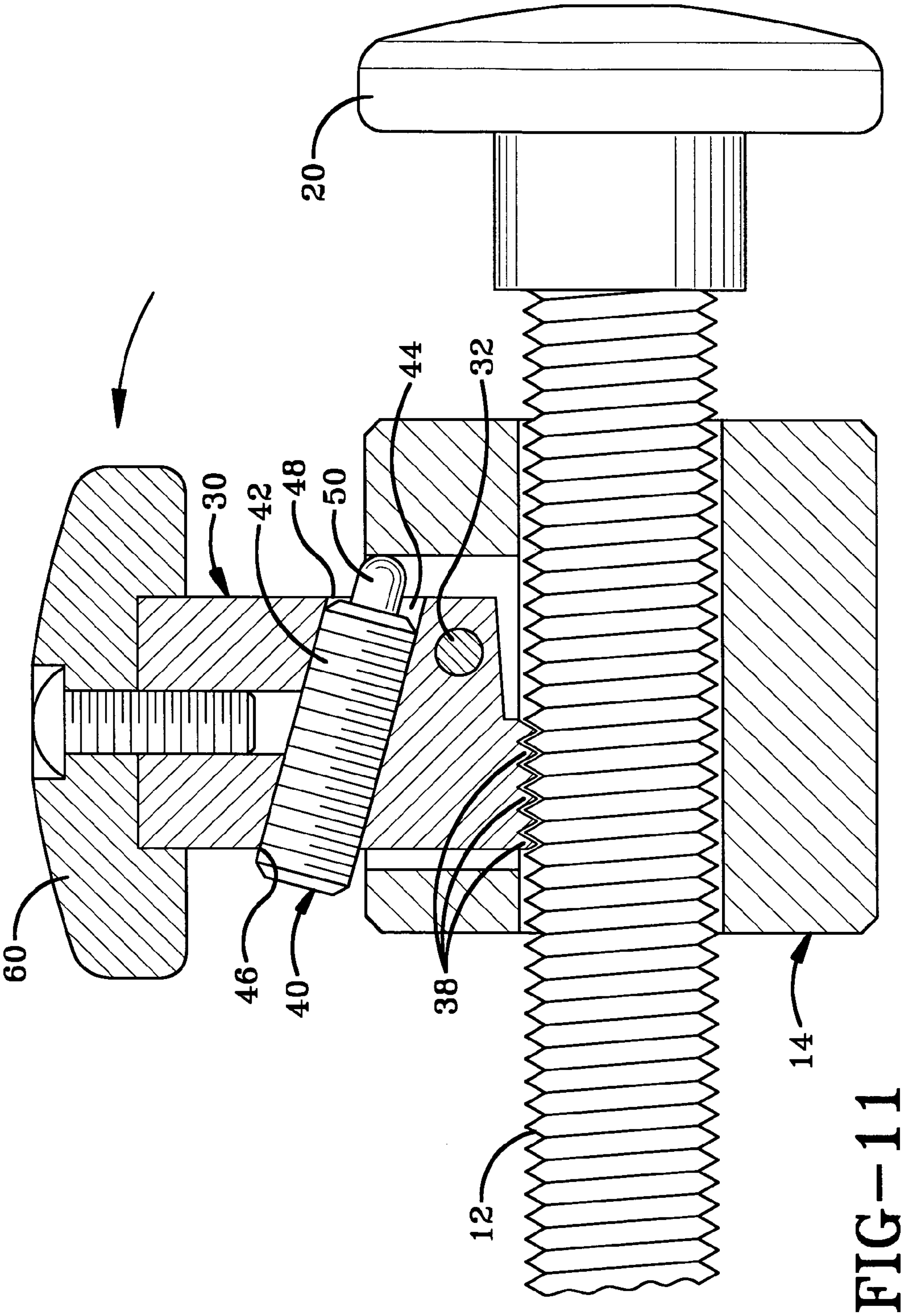
FIG. 11 shows the pawl being locked back into the threaded rod.

The unlocked position of pawl 30 is depicted in FIGS. 8-10 where the user has tilted pawl 30 backwards toward handle 20 causing teeth 38 to lift up and away from threaded rod 12. In this position, biasing element 40 is compressed and the user must hold pawl 30 in position while the gross adjustment occurs. FIG. 10 shows the user pushing threaded rod 12 rapidly through collar with pawl 30 in the unlocked position. In this position, the user does not have to overcome the holding force of pawl to make the adjustment. In the unlocked position of pawl 30, the user may also pull threaded rod 12 through collar 14 in the direction opposite of that shown in FIG. 10.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A ratchet assembly comprising:

a threaded rod having a longitudinal axis extending from a first end to a second end;

a support collar having axial and radial directions; the support collar defining a bore in the axial direction;

a portion of the threaded rod being disposed in the axial bore of the support collar;

a ratchet pawl pivotably carried by the support collar between locked and unlocked positions; the ratchet pawl pivoting about a pivot axis disposed perpendicular to the longitudinal axis of the threaded rod; the ratchet pawl being biased toward the locked position;

the ratchet pawl having at least one tooth that threadably engages the threaded rod when the ratchet pawl is in the locked position to allow the threaded rod to threadably rotate with respect to the support collar for fine position adjustments;

the ratchet pawl automatically pivoting to the unlocked position when the threaded rod is forced in a direction from the first end toward the second end to allow for gross position adjustments between the threaded rod and the support collar;

the ratchet pawl automatically pivoting to the locked position when the threaded rod is forced in a direction from the second end toward the first end to lock the gross position of the threaded rod with respect to the support collar; and the tooth of the ratchet pawl being disengaged from the threaded rod when the ratchet pawl is manually moved to the unlocked position to allow the threaded rod to be moved in a direction from the second end toward the first end of the threaded rod;

a biasing element engaging the support collar to bias the ratchet pawl toward the locked position; and the biasing element including an externally threaded sleeve that is threaded into ratchet pawl such that rotation of the threaded sleeve adjusts the position of the sleeve with respect to the ratchet pawl.

2. The ratchet assembly of claim 1, wherein the ratchet pawl defines a threaded opening positioned to have an inlet that is positioned outside the support collar when the ratchet pawl is in the locked position; the threaded opening has an outlet positioned to be at least partially inside the support collar when the ratchet pawl is in the locked position; the threaded sleeve being at least partially disposed in the threaded opening.

3. The ratchet assembly of claim 2, further comprising a push rod slidingly disposed within sleeve and extending from the outlet of the sleeve to engage the support collar; and a spring disposed inside the sleeve to bias the push rod toward the support collar.

4. A ratchet assembly comprising:

a threaded rod having a longitudinal axis extending from a first end to a second end;

a support collar having axial and radial directions; the support collar defining a bore in the axial direction;

a portion of the threaded rod being disposed in the axial bore of the support collar;

a ratchet pawl pivotably carried by the support collar between locked and unlocked positions; the ratchet pawl pivoting about a pivot axis disposed perpendicular to the longitudinal axis of the threaded rod; the ratchet pawl being biased toward the locked position;

a biasing element carried by the support collar; the biasing element engaging the support collar to bias the ratchet pawl toward the locked position;

the ratchet pawl defining a threaded opening positioned to have an inlet that is positioned outside the support collar when the ratchet pawl is in the locked position; the threaded opening has an outlet positioned to be at least partially inside the support collar when the ratchet pawl is in the locked position;

the biasing element including an externally threaded sleeve that is threaded into the threaded opening of the ratchet pawl such that rotation of the threaded sleeve adjusts the position of the sleeve with respect to the ratchet pawl;

a push rod slidingly disposed within the sleeve and extending from the outlet of the sleeve to engage the support collar;

a spring disposed inside the sleeve to bias the push rod toward the support collar;

the ratchet pawl having a plurality of teeth that threadably engage the threaded rod when the ratchet pawl is in the locked position to allow the threaded rod to threadably rotate with respect to the support collar for fine position adjustments;

the ratchet pawl having a longitudinal centerline; the pivot axis and the teeth of the ratchet pawl being disposed on opposite sides of the longitudinal centerline of the ratchet pawl;

the ratchet pawl being free of teeth disposed on the same side of the longitudinal centerline as the pivot axis;

the ratchet pawl automatically pivoting to the unlocked position when the threaded rod is forced in a direction from the first end toward the second end to allow for gross position adjustments between the threaded rod and the support collar;

the ratchet pawl automatically pivoting to the locked position when the threaded rod is forced in a direction from the second end toward the first end to lock the gross position of the threaded rod with respect to the support collar; and the teeth of the ratchet pawl being disengaged from the threaded rod when the ratchet pawl is manually moved to the unlocked position to allow the threaded rod to be moved in a direction from the second end toward the first end of the threaded rod.

5. The ratchet assembly of claim 4, further comprising an end handle non-rotatably connected to the first end of the threaded rod.

6. The ratchet assembly of claim 4, further comprising a mount rotatably connected to the second end of the threaded rod.

7. The ratchet assembly of claim 4, wherein the threaded rod has an exterior curvature and each tooth of the ratchet pawl is curved to match the curvature of the threaded rod.

8. The ratchet assembly of claim 4, wherein the ratchet pawl has a width; each tooth of the ratchet pawl having the same width as the ratchet pawl.

* * * * *